Patented Aug. 5, 1952

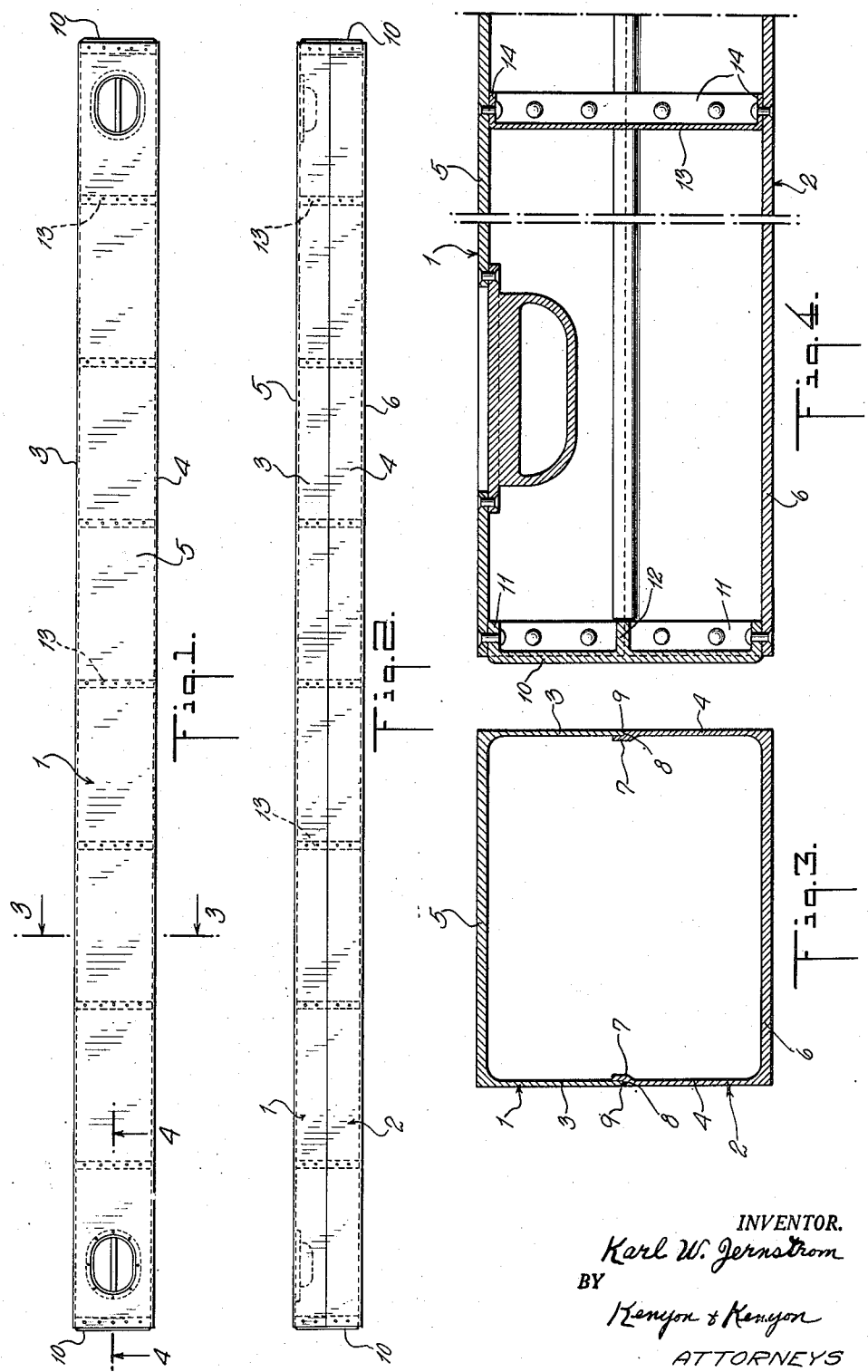

2,605,866

UNITED STATES PATENT OFFICE 2,605,866

METAL HATCH PONTOON

Karl W. Jernstrom, Verona, N. J., assignor to Seaboard Machinery Corporation, New York, N. Y., a corporation of New York Application July 17, 1948, Serial No. 39,207

1 Claim. (Cl. 189—34)

This invention relates to metal hatch elements for ship cargo hatchways.

The primary object is to provide a hatch element, particularly a pontoon, which may be simply constructed from light-metal, as exemplified by aluminum and magnesium alloys, using the minimum of metal required to provide it with the beam strength required when in use, yet with the element reinforced to withstand the abuse incidental to its handling, such as is occasioned by its being dropped or banged about.

Certain principles of the invention may prove applicable to the structural metal beam art generally. In this art the use of steel might be preferred.

The principles of the invention may be understood from the following disclosure of a ship hatch pontoon embodying all phases of the invention in what is presently considered the best manner.

In the accompanying drawings

Fig. 1 is a top view of the hatch pontoon;

Fig. 2 is a side view of Fig. 1;

Fig. 3 is a cross section, of enlarged scale, taken from the line 3—3 in Fig. 1; and Fig. 4 is a longitudinal section in a vertical plane, also of enlarged scale, taken from the line 4—4 in Fig. 1.

These drawings illustrate the hatch pontoon as including two extruded light-metal channels 1 and 2. Each channel has flanges 3 and 4, respectively, that are thinner than their webs 5 and 6, respectively. In both instances the flanges are at right angles to the webs and have substantially equal depths, and the webs are of equal widths. The flange and web thickness of the two channels are the same. The two flanges are arranged face to face with their flange end edges joined together by welding metal applied by welding methods properly applicable to the particular light-metal used.

In the above fashion it is possible to design the pontoon with the proper beam strength while using the minimum of metal. The thicker metal top and bottom, provided by the thicker webs 5 and 6, can be calculated to properly carry the tension and compression, while the thinner sides, provided by the flanges 3 and 4, can be calculated to carry the compound stress of tension and compression. However, calculations leading to a minimum of metal result in the side walls, formed by the flanges 3 and 4, being so thin that they cannot adequately carry the shear stress resulting when the pontoon is abused, as by being dropped or banged during its handling.

With the above in mind, the lower channel section 2 is extruded with its flange ends inwardly jogged, as indicated at 7. This is done so the jogged ends are displaced inwardly distances equaling the thickness of the flanges 3, and the latter are telescoped about these jogged ends 7 to produce walls with smooth exteriors. Also, the channel 2 is extruded to provide shoulders 8 against which the flanges 3 abut when the two channels are assembled together. The outer corners of the shoulders and of the ends of the flanges 3 may be chamfered, thus providing grooves for receiving the welding metal 9 joining the two channels together.

The above results in the relatively thin side walls, of the pontoon, having centrally positioned and longitudinally extending reinforcing ribs which project inwardly of the pontoon's sides, where they are out of the way. These ribs reinforce the side walls so that they can carry the shear with which they might be stressed when the pontoon is abused as mentioned. These ribs extend along the neutral axis of the pontoon when it is stressed with bending force, but they perform their intended function whenever the side walls are placed in shear.

The ends of the pontoon may be closed by end castings 10 having inwardly extending circumferential flanges 11 fitting the inside of the pontoon. Blind rivets may be used to fasten these castings, the rivets being applied through the walls of the pontoon and the end casting flanges. These end castings may be shaped to clear the ribs provided by the jogs 7, or these ribs may be cut away as required to permit insertion of the end castings 10, the latter being illustrated. In any event, it is considered best to provide the end castings 10 with internal reinforcing ribs 12 arranged transversely in line with the reinforcing ribs provided by the jogged flange ends.

A series of strutting plates 13 may be positioned inside the pontoon to support the walls of the box section formed by the two channels. These strutting plates may be bent to have peripheral flanges 14, and formed as required to clear the internal reinforcing ribs. They may be installed by the use of blind rivets in the manner of the end castings.

The drawings illustrate handle basins in the pontoon's top. These are not described since the present invention is not concerned with them.

The end castings 10 and the strutting plates 13 are preferably made of the same light-metal from which the channels are extruded. The rivets may also be made of the same metal.

It is obvious from the foregoing that certain phases of this invention are applicable to the structural beam art generally, as previously indicated. In such instances it might not be objectionable to jog the flange ends outwardly. In the case of a hatch element it is considered preferable to have the jogs inside so the reinforcing ribs may be out of the way, thus permitting a number of the elements to be placed close together. In some instances it might not be objectionable to have the upper channel with the jogged ends. However, in the case of a hatch element the illustrated construction has the advantage of providing water sheds in the event the lines of welding metal are discontinuous either through inadvertence or intent. This desirable effect cannot be attained when the upper channel has the jogged ends, excepting by having the jogs outwardly of the element where the reinforcing ribs, thus provided, are on the outside.

It can be appreciated from the above that while certain phases of the invention are applicable to the structural beam art generally, that in the ship hatch element art they provide new and unexpected results.

I claim:

A metal ship hatch element comprising a pair of elongated channels, each of said channels including a web and having flanges integral with said web and formed perpendicular thereto, the webs of said channels being thicker than their flanges, the flanges of one of said channels being inwardly jogged at the end sections thereof, thereby defining a shoulder portion, the flanges of the other of said channels having comparatively straight end sections, which are received by said shoulder portions, the abutting flanges defining a reinforcing rib on the inner surface of said element and a smooth surface on the other side thereof, end closures disposed transversely at the end points of said element, and a plurality of plates transversely positioned along the inner surfaces of said channels, said end closures and plates secured to said channels and providing reinforcement therefor.

KARL W. JERNSTROM.

REFERENCES CITED

The following references are of record in the file of this patent:

UNITED STATES PATENTS

| Number | Name | Date |
| --- | --- | --- |
| 854,947 | Hill | May 28, 1907 |
| 859,176 | Hill | July 2, 1907 |
| 1,761,037 | Gross | June 3, 1930 |
| 2,457,129 | Collings | Dec. 28, 1948 |

FOREIGN PATENTS

| Number | Country | Date |
| --- | --- | --- |
| 395,540 | Great Britain | July 20, 1933 |